(12) United States Patent
Veal et al.

(10) Patent No.: US 9,460,040 B2
(45) Date of Patent: Oct. 4, 2016

(54) METHOD, DEVICE AND SYSTEM FOR AGGREGATION OF SHARED ADDRESS DEVICES

(75) Inventors: Bryan E. Veal, Beaverton, OR (US); Eric R. Wehage, Tenino, WA (US); Annie Foong, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 361 days.

(21) Appl. No.: 13/997,512

(22) PCT Filed: Dec. 22, 2011

(86) PCT No.: PCT/US2011/067011
§ 371 (c)(1),
(2), (4) Date: Jun. 24, 2013

(87) PCT Pub. No.: WO2013/095562
PCT Pub. Date: Jun. 27, 2013

(65) Prior Publication Data
US 2013/0339565 A1    Dec. 19, 2013

(51) Int. Cl.
*G06F 3/00* (2006.01)
*G06F 13/36* (2006.01)
*G06F 13/40* (2006.01)
*G06F 7/00* (2006.01)
*G06F 3/02* (2006.01)
*G06F 9/44* (2006.01)
*G06F 13/10* (2006.01)

(52) U.S. Cl.
CPC ......... *G06F 13/4027* (2013.01); *G06F 3/0205* (2013.01); *G06F 7/00* (2013.01); *G06F 9/441* (2013.01); *G06F 13/105* (2013.01)

(58) Field of Classification Search
CPC .......... G06F 3/00; G06F 3/038; G06F 3/162; G06F 13/00
USPC .................... 710/306, 8, 10, 14, 15
See application file for complete search history.

(56) References Cited

U.S. PATENT DOCUMENTS

| | | | |
|---|---|---|---|
| 5,444,850 A * | 8/1995 | Chang | G06F 9/4416 707/999.2 |
| 5,555,401 A | 9/1996 | Allen et al. | |
| 2003/0154337 A1 * | 8/2003 | Ohno | G06F 9/45533 710/260 |

(Continued)

OTHER PUBLICATIONS

"PCT, International Search Report of the International Searching Authority for Int'l Application No. PCT/US2011/067011", (Sep. 21, 2012), Whole Document.

(Continued)

*Primary Examiner* — Idriss N Alrobaye
*Assistant Examiner* — Getente A Yimer
(74) *Attorney, Agent, or Firm* — Blakely, Sokoloff, Taylor & Zafman LLP (57) ABSTRACT

Techniques and mechanisms for managing resources of an aggregate device which spans multiple physical devices of a computer platform. In an embodiment, an aggregation device coupled to a host bus of the computer platform receives resource information generated by a pre-boot software process of the computer platform. In another embodiment, the aggregation device, based on the received resource information, represents a resource in a first input/output (I/O) device to a host operating system (OS) as residing in the aggregation device, the first I/O device coupled to the aggregation device via a host bus for exchanging communications referencing a shared address space.

27 Claims, 7 Drawing Sheets

(56) References Cited

U.S. PATENT DOCUMENTS

| | | | |
|---|---|---|---|
| 2004/0172494 A1* | 9/2004 | Pettey | G06F 13/4022 710/305 |
| 2005/0010736 A1 | 1/2005 | Qureshi et al. | |
| 2005/0240942 A1 | 10/2005 | Hampton et al. | |
| 2006/0015673 A1* | 1/2006 | Morrow | G06F 13/387 710/315 |
| 2006/0136612 A1 | 6/2006 | Aslot et al. | |
| 2009/0216922 A1* | 8/2009 | Park | G06F 13/4045 710/63 |
| 2009/0248924 A1* | 10/2009 | Melin | G06F 5/006 710/63 |

OTHER PUBLICATIONS

"International Preliminary Report on Patentability (Chapter I of the Patent Cooperation Treaty) for International Application No. PCT/US2011/067011", (Jul. 3, 2014), Whole Document.

* cited by examiner

METHOD, DEVICE AND SYSTEM FOR AGGREGATION OF SHARED ADDRESS DEVICES

CLAIM OF PRIORITY

This application is a U.S. National Phase application under 35 U.S.C. §371 of International Application No. PCT/US2011/067011, filed Dec. 22, 2011, entitled "METHOD, DEVICE AND SYSTEM FOR AGGREGATION OF SHARED ADDRESS DEVICES," the entire contents of which are incorporated herein by reference.

BACKGROUND

1. Technical Field

Embodiments generally relate to device aggregation for a computer platform. More particularly, certain embodiments relate to representing a resource in one physical device of a computer platform to a host OS as residing in another physical device of the computer platform.

2. Background Art

In a conventional computer platform, a storage host bus adapter (HBA) provides for a host an interface to one or more platform devices (e.g. disks) and/or a network HBA provides for the host an interface to one or more network devices. A host operating system (OS) of such a computer platform traditionally treats each adapter device attached directly to a host bus as an independent entity, where each of the attached devices is managed by an independent device driver instance.

Figure 1:
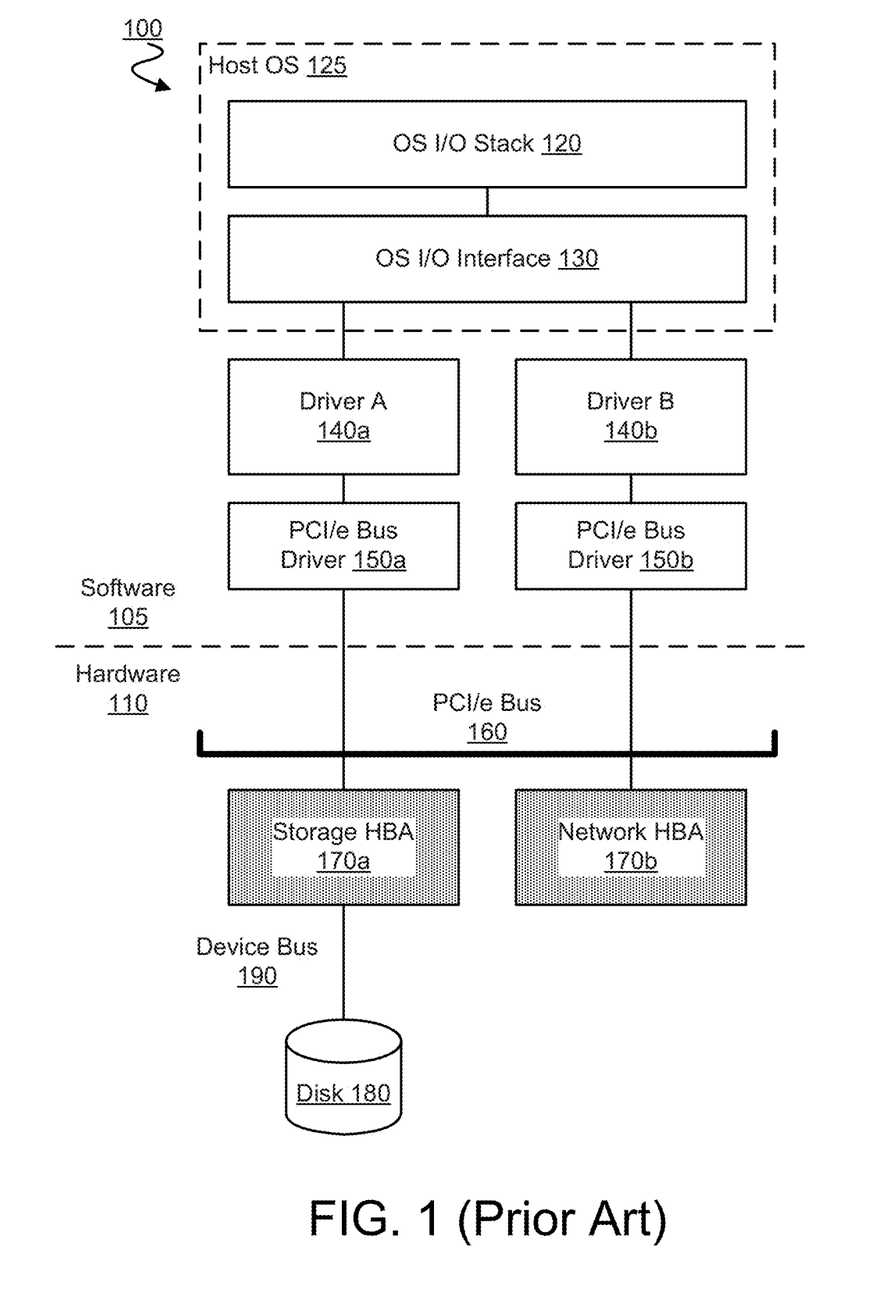
FIG. 1 is a block diagram illustrating features of a conventional computer platform for providing device aggregation.

For example, FIG. 1 illustrates a conventional computer platform 100 including hardware 110 and software 105 which executes, for example, with a processor and memory (not shown) of computer platform 100. Hardware 110 includes both a storage HBA 170a and a network HBA 170b and a host bus 160—for example, a Peripheral Component Interconnect (PCI) bus, PCI Express bus, and/or the like—coupled thereto. Storage HBA 170a makes an adapted device—e.g. a disk 180—available for the host to access via host bus 160, where storage HBA 170a terminates transactions on the host-facing side, and instantiates a substitute set of transactions (of a protocol different from that of the host-bus) on the device-facing side. Storage HBA 170a is able to do so as it deals with a host bus 160 addressing domain that is different from the device bus 190 addressing domain.

Under current techniques, a driver A 140a and a separate driver B 140b of software 105 are needed to operate storage HBA 170a and network HBA 170b, respectively. A host OS 125 of software 105 includes an OS input/output (I/O) stack 120 for storing I/O information, and an OS I/O interface 130 for host OS 125 to perform respective I/O with storage HBA 170a and network HBA 170b by variously exchanging I/O information with various driver processes such as driver A 140a and driver B 140b.

An increasing number and variety of I/O devices, such as PCIe-based storage devices (e.g. PCIe SSDs, PCIe Hybrid drives) for example, are capable of attaching to a host bus directly—e.g. by virtue of their capacity for fast bus communication rates—without the need of any intermediary HBA. Directly coupling such devices to a host bus moves the burden of aggregation of such devices to host software. Conventionally, host OS 125 is needed to manage aggregation across multiple directly-coupled host bus devices through their respective drivers (for example driver A 140a and driver B 140b).

However, aggregation at layers above driver A 140a and driver B 140b poses many problems, including long latency, for example. In the architecture of some host OSes, for example, driver instances (even for similar I/O devices) are not permitted to communicate directly with each other, except through upper layer filter drivers (not shown). Moreover, some OSs require OS I/O interface 130 to include functionality to handle PCI-level hardware events (e.g. hotplug, power, errors, and designating driver load order). Linux OSs do not even support hot-plugging of some host bus switches, for example. Various events specific to the host bus, such as PCI-related or PCIe-related events, are currently handled directly by the OS's host bus driver processes—e.g. PCIe bus driver instances 150a, 150b—leaving no opportunity for the individual I/O device driver instances to coordinate an aggregation-aware response. For example, various I/O device insertions, removals, errors, or power state events are handled at host OS 125. Each child device driver instance is not expected to behave as its parent volume driver, since, for example, only its parent volume driver holds knowledge and expected behavior of the multiple child devices as a volume. Such problems make it difficult for separate I/O device driver instances to efficiently provide coordinated device aggregation.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Embodiments described herein variously provide for operation of a device, referred to herein as an aggregation device (AD), including hardware to aggregate a set of host bus devices of a computer platform into a combined group (referred to herein as a "volume"). Unlike current HBA techniques, for example, an AD may, in an embodiment, aggregate itself and one or more other devices, where the aggregate is represented as a single device to a host OS and aggregated devices are visible globally in a shared address space. Since only a single device is presented to host software, operation of AD hardware may, for example, allow respective logical drivers for one or more host bus devices of a volume to appear as a single driver instance to host OS. In certain embodiments, AD functionality may provide domain isolation such that errors and/or other events of the domain are contained within the domain and do not affect the normal functioning of the computer platform. In another embodiment, the AD may provide error and/or event aggregation to enable volume-aware handling.

With respect to an AD, the terms "aggregate," "aggregated," "aggregating," "aggregation," etc. variously refer herein to the representation, in one or more respects, of a set of resources as residing within a single (aggregate) device of a computer platform, where the set of resources includes resources which actually reside in different respective physical devices of the computer platform.

A physical device having one or more resources which are to be represented as belonging to some other (physical or merely logical) device is referred to herein as a "child device". Similarly, a device referred to herein as a "parent" device may serve as the device into which child device resources are logically aggregated for representation to the host OS. In an embodiment, a parent device may be a physical device represented as such to the host OS. However, the host OS may be unable to identify, in one or more respects, that the parent device does not physically include one or more child device resources. By way of illustration and not limitation, various embodiments may prevent one or more mechanisms for the host OS to determine that a represented aggregate device is instead an aggregation of resources in different respective physical devices. Alternatively or in addition, various embodiments may prevent one or more mechanisms for the host OS to identify a child device as being a distinct physical device.

As used herein, "host bus" refers to a bus, link, interconnect, and/or the like of a computer platform which exchanges I/O communications using a shared address space. A host bus may, for example, include a bus conforming with a Peripheral Component Interconnect (PCI) standard of the PCI Special Interest Group (PCI-SIG)—e.g. the PCI 3.0 local bus specification of Aug. 12, 2002, the PCI Express (PCIe) 3.0 specification of November 2010, and/or the like. A "shared address space" refers to a set of addresses known to multiple devices, allowing one such device to manipulate and/or communicate with another such device over a bus by referencing the shared address space—e.g. by specifying one of the set of addresses—in a communication exchanged over that bus. Such a communication may be an instruction to load or store (equivalently, read or write) data to an address known to both devices. An address may identify a memory location, resource of a device, a register of a device, a function of a device, and/or the like. In an embodiment, the host bus is coupled between a physical device of the computer platform which includes an AD and which further includes, or is coupled to, an I/O device which is to operate as a child device of an aggregate device represented to the host OS. The host bus may further couple a processing unit of the computer platform—e.g. a CPU—to all I/O devices which might be designated to serve as a child device of some aggregate device.

To illustrate features of certain embodiments, various features of an aggregation device are discussed herein with reference to a child device which resides in the same computer platform as does the aggregation device. However, such discussion may be extended to additionally or alternatively apply, according to different embodiments, to an aggregation device aggregating a child device which resides on another computer platform. Such a child device may, for example, reside on a second computer platform coupled to a first computer platform which includes the aggregation device. The two platforms may, for example, be coupled via a network interface which includes aggregation functionality such as that discussed herein. In an embodiment, a host OS of the first computer platform may share an address space with one or more resources of the second platform—e.g. where the host OS references the shared address space when communicating via a host bus of the first communication platform.

In certain embodiments, a parent device may be implemented by a subset of hardware in a larger physical device—e.g. where the subset of hardware includes circuit logic to represent the subset as being a distinct physical host bus device. For example, AD hardware may, in certain embodiments, include logic to provide PCI configuration space data (bus/device/function identifiers, etc.) or other such enumeration information to represent itself to the host OS as being a distinct I/O device—e.g. an endpoint device—which is attached to the host bus.

An AD may include logic to receive and store information (referred to herein as "resource information"), some or all of which is for configuring I/O access to a parent device and/or a child device. Such resource information may, for example, include or otherwise be based on input data provided by a user to define a volume configuration for the computer platform. Alternatively or in addition, such resource information may be retrieved from non-volatile memory—e.g. during boot-time configuration of the computer platform. For example, such resource information may be retrieved by a BIOS process, a Unified Extensible Firmware Interface (UEFI) process or other such executing software and provided to the AD.

Figure 2A:
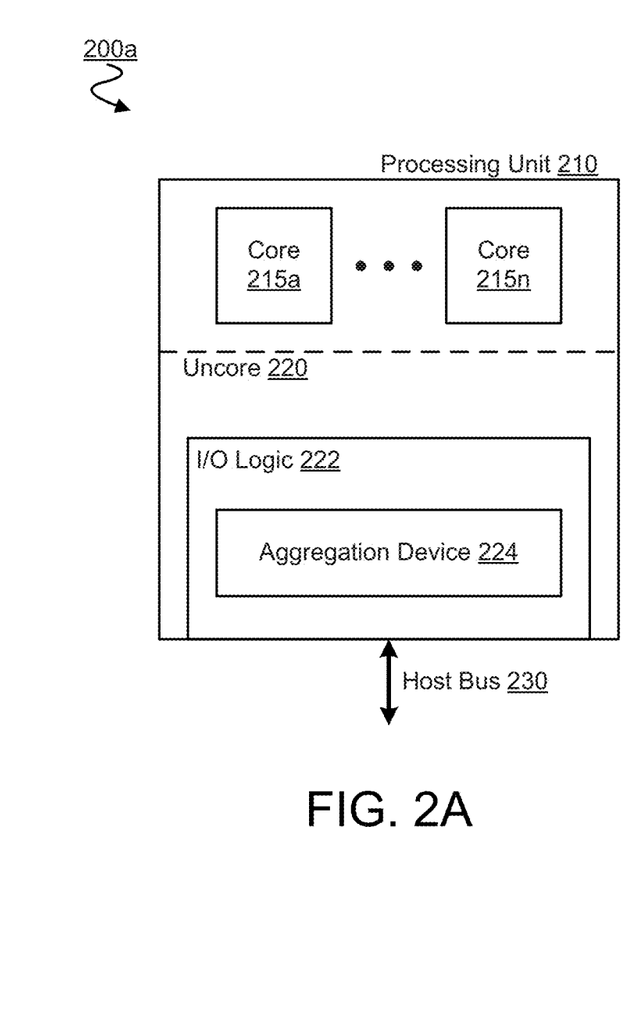
FIG. 2A is a block diagram illustrating features of a host system for providing device aggregation according to an embodiment.

FIG. 2A illustrates select elements of a system 200a in a computer platform for providing device aggregation according to an embodiment. System 200a includes a processing unit 210 coupled to a host bus 230 for communicating with one or more I/O devices (not shown) of the computer platform. Processing unit 210 may be coupled to one or more additional or alternative host buses, according to different embodiments, for variously communicating with different I/O devices of the computer platform.

Processing unit 210 may include one or more processing cores, represented by an illustrative cores 215a, . . . , 215n. In an embodiment, a host OS may execute on one of cores 215a, . . . , 215n. As used herein, "host OS" refers to a lowest level OS executing on a computer platform—e.g. where any virtual machines, guest OSs or other virtualization processes of the computer platform run on top of the host OS. In an embodiment, the host OS includes an OS I/O stack and an OS I/O interface for communication between the OS I/O stack and one or more device drivers.

As used herein, "I/O device" refers to a device in a computer platform which provides information to, and/or receives information from, a processor core of a computer platform. Such information may include command, address and/or data information—e.g. including information to be stored locally on the I/O device and/or to be forwarded by the I/O device to one or more other devices residing on, or outside of, the computer platform. By way of illustration and not limitation, an I/O device may include one or more of a solid state drive (SSD), a hard disk drive (HDD), a bridge, a switch, a host bus adapter (HBA), a network interface and/or the like. In an embodiment, an I/O device coupled to processing unit 210 via host bus 230—e.g. a HBA, bridge, switch, etc.—may also couple one or more other I/O devices to host bus 230.

Cores 215a, ..., 215n may be coupled to an uncore 220 of processing unit 210 which, in an embodiment, includes I/O logic 222—e.g. controller logic to support communication with one or more I/O devices by the host OS. By way of illustration and not limitation, I/O logic 222 may include host bus controller hardware to control a host bus 230—e.g. a PCI bus, a PCIe bus and/or the like.

I/O logic 222 may include AD 224 for aggregation of one or more resources of one or more I/O devices coupled to host OS 230. By way of illustration and not limitation, AD 224 may provide child device resource information which, for example, facilitates representation of an aggregate device to an I/O manager of the host OS running on cores 215a, ... 215n. Processing unit 210 may also be considered an AD at least insofar as AD 224 is a component of processing unit 210 which provides its device aggregation functionality. In an embodiment, AD 224 may be included in an I/O hub, a memory controller hub, a switch, a bridge, a northbridge, a southbridge and/or the like, which may or may not be integrated into uncore 220. In an embodiment, AD 224 is in-line hardware exchanging messages between some or all of cores 215a, ..., 215n and host bus 230. In another embodiment, AD 224 provides aggregation functionality for configuring software to process such messages—e.g. where host bus 230 a driver process executing with cores 215a, ..., 215n exchange such messages along a hardware communication path which is independent of AD 224.

A single AD driver instance for driving operation of AD 224 may manage I/O access to one or more aggregated child devices. Some or all child devices of the aggregate device may be hidden from the host OS. For example, addresses of configuration registers and/or data registers of a device may be available to the host OS I/O manager only through AD 224 and/or the AD driver. While register addresses of these devices may be hidden from direct detection by the host OS, the AD driver may access the registers directly without redirecting the communication with the AD. Even ports, links, and bridges may be taken over by AD hardware 224, allowing coordinated management across child devices within a single driver instance.

Figure 2B:
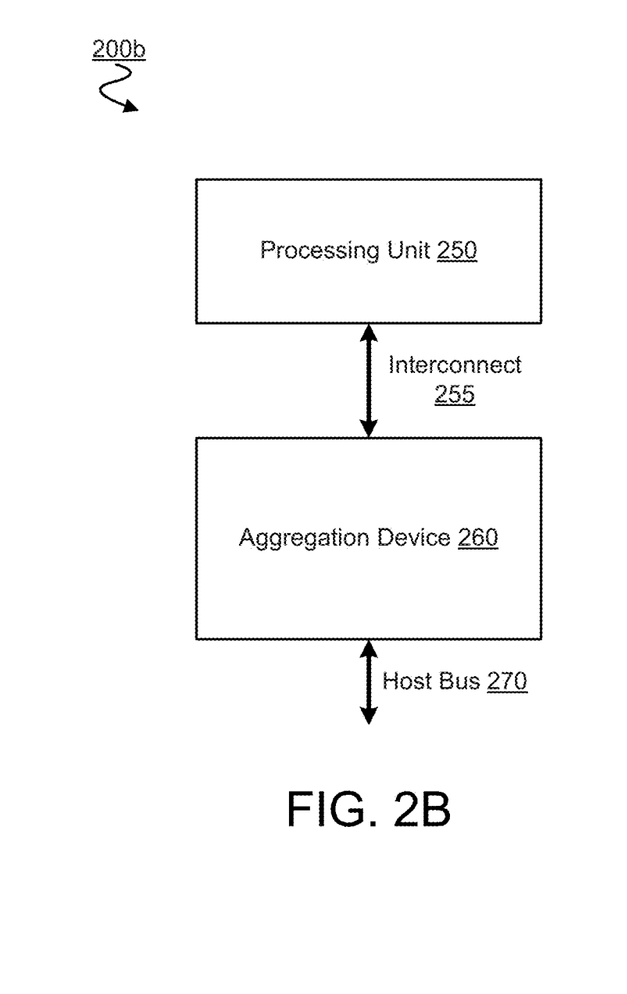
FIG. 2B is a block diagram illustrating features of a host system for providing device aggregation according to an embodiment.

FIG. 2B illustrates elements of a system 200b in a computer platform for providing device aggregation according to an embodiment. System 200b may provide some or all of the functionality of system 200a, for example.

In an embodiment, system 200b includes a processing unit 250 coupled to aggregation 260 via an interconnect 255 and a host bus 270 coupled to AD 260. Processing unit 250 may include one or more processor cores (not shown) to execute a host OS and one or more device drivers. For example, processing unit 250 may provide some or all of the processing functionality of the one or more cores 215a, ..., 215n, although certain embodiments are not limited in this regard. AD 260 may be dedicated for device aggregation or, alternatively, may provide aggregation functionality incorporated into an I/O hub, a memory controller hub, a switch, a bridge, a northbridge, a southbridge or other device.

AD 260 may couple processing unit 250 to host bus 270 and, in an embodiment, to one or more I/O devices (not shown) which are also coupled to host bus 270. In an embodiment, AD 260 provides some or all of the functionality of AD 224. In an embodiment, AD 260 represents itself in one or more respects to the host OS as including one or more resources which actually reside in one or more child devices (not shown) which are coupled to AD 260 via host bus 270.

Based on such representation, a single AD driver instance for driving operation of AD 260 may manage I/O access to the aggregated devices. Some or all child devices of the aggregate device may be hidden from detection by the host OS. For example, the resources of a child device, which may include its configuration registers, I/O registers, and/or the like, may be available to the host OS only through AD 260 and/or the AD driver. Even ports, links, and bridges may be taken over by AD 260, allowing coordinated management across the devices within a single driver instance.

Figure 3:
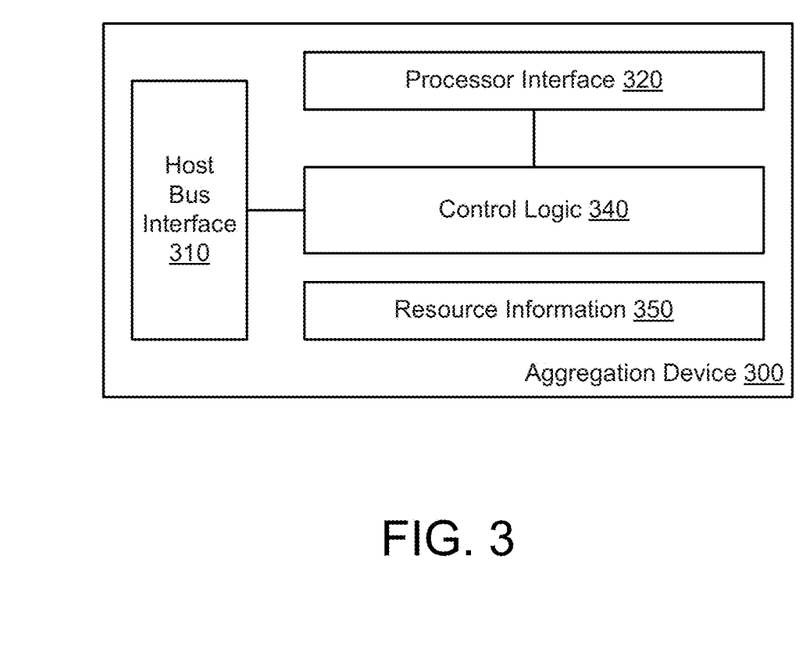
FIG. 3 is a block diagram illustrating features of an aggregation device according to an embodiment.

FIG. 3 illustrates some elements of a AD 300 according to an embodiment for supporting, at least in part, information describing a set of resources of one or more child devices. The information, for example, may include references to resources of different devices coupled to a host bus of the computer platform. AD 300 may include some or all of the functionality of AD 260 or of processing unit 210, although certain embodiments are not limited in this regard.

In an embodiment, AD 300 includes a control logic 340 including hardware—e.g. data storage, circuit logic, etc.—to support at least in part representation of an aggregate device to a host OS of the computer platform. For example, the control logic 340 may represent an aggregate device by representing resources of one or more child devices as resources belonging to AD 300. AD 300 may further include host bus interface 310 to couple AD 300 to the host bus of the computer platform. Host bus interface 310 may include connector hardware, protocol logic and/or the like to support control logic 340 connecting to and/or communicating via the host bus. For example, host bus interface 310 may include PCI and/or PCIe interface logic, although certain embodiments are not limited in this regard.

AD 300 may additionally or alternatively include processor interface 320 to exchange communications between control logic 340 and one or more processor cores of the computer platform. The one or more processor cores may execute a host OS, for example. In an embodiment, processor interface 320 may be to couple AD 300 to a processing unit including the one or more cores—e.g. via a system bus or other such interconnect.

AD 300 may include resource information 350 comprising information about resources of one or more child devices. In an embodiment, resource information 350 may contain addresses of configuration registers, I/O registers, and/or the like, of one or more child devices. In an embodiment, such addresses may be part of a shared address space shared among child devices, the AD, cores, processing units, system memory, and/or the like.

Figure 4A:
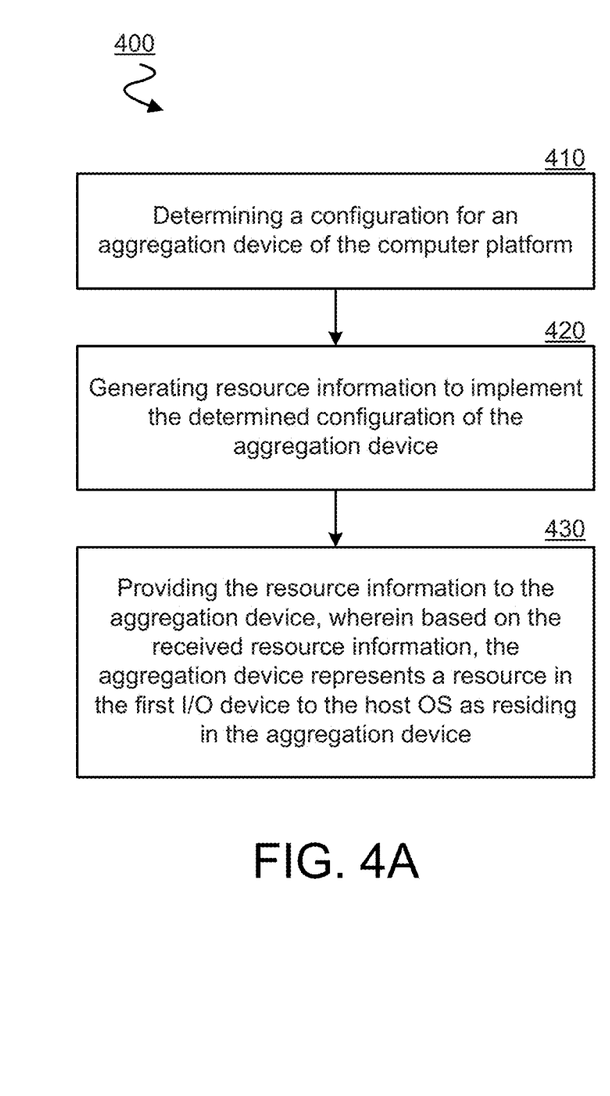
FIG. 4A is a flow diagram illustrating features of a method for configuring an aggregation device according to an embodiment.

FIG. 4A illustrates some elements of a method 400, according to an embodiment, for configuring an AD of a computer platform. Method 400 may be performed by a computer platform which some or all of the functionality of system 200a or of system 200b—e.g. during pre-boot operation of the computer platform. For example, method 400 may, for example, be performed by a pre-boot process—e.g. firmware interface software such as BIOS software, UEFI software and/or the like—which executes on a processing unit before a host OS is to execute.

Method 400 may include, at 410, determining a configuration for an AD of the computer platform. The AD may, for example, include some or all of the features of AD 300, although certain embodiments are not limited in this regard. In an embodiment, the AD is coupled to a processor core for executing a host OS of the computer platform, and further coupled via a host bus to a first input/output (I/O) device, the host bus for exchanging communications referencing a shared address space.

In an embodiment, determining the configuration for the AD at 410 includes identifying that the first I/O device is to operate as a child device of the AD. For example, the determining at 410 may retrieve from non-volatile memory aggregation information identifying which I/O devices, ports, links, switches, connections, and/or the like of the computer platform should be aggregated by the AD, and/or whether the host bus should be extended to devices which should be aggregated by the AD.

Method 400 may further include, at 420, generating resource information to implement the determined configuration of the AD. Generating the resource information at 420 may, for example, include a pre-boot process performing an enumeration of devices which the determined configuration indicates are to operate as child devices of the AD. The pre-boot process may, for example, assign unique numbers to ports, links, switches, connections, buses and/or the like—e.g. the numbers for runtime software to reference for accessing the child devices.

Alternatively or in addition, generating the resource information at 420 may include determining a total amount of resources required for an aggregate device, wherein the AD is a parent device of the aggregate device and the first I/O device is a child device of the aggregate device. For example, a pre-boot process may determine the respective sizes of configuration register spaces and/or I/O register spaces of AD and the child devices, and calculate a sum of the respective sizes.

Method 400 may further include, at 430, providing the resource information to the AD—e.g. for configuration of the AD to expose the AD and the resources of one or more child devices as an aggregate device. Based on the resource information provided at 430, the AD may represent a resource in the first I/O device to the host OS as residing in the AD. Such a representation may, for example, include the AD representing an address in the shared address space to the host OS as addressing the resource. For example, configuration and I/O registers belonging to child devices may be assigned addresses in the shared address space which appear to be assigned to registers of the AD. In an embodiment, providing the resource information at 430 is to configure the AD to request from the host OS an allocation of the total amount of resources. The AD may thus be configured to represent enough address space to uniquely represent as its own registers, all registers of all child devices and the AD.

Figure 4B:
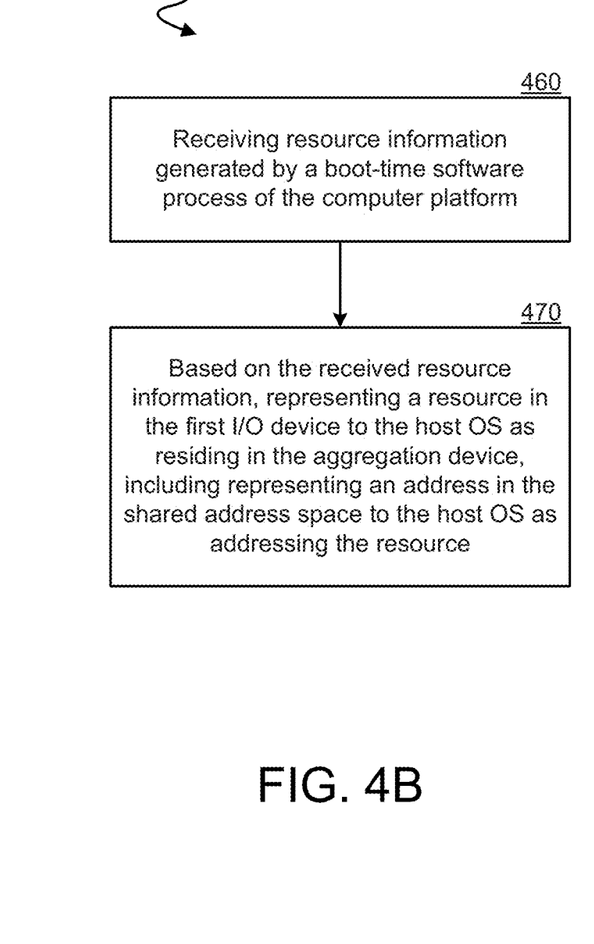
FIG. 4B is a flow diagram illustrating features of a method for operating an aggregation device according to an embodiment.

FIG. 4B illustrates some elements of a method 450, according to an embodiment, for operating an AD of a computer platform. Method 450 may be performed, for example, by an AD having some or all of the features of AD 300.

Method 450 may include, at 460, receiving at the AD resource information generated by a pre-boot software process of the computer platform—e.g. the resource information provided according to operations such as those of method 400. In an embodiment, the AD is coupled to a processor core for executing a host OS of the computer platform, and further coupled via a host bus to a first input/output (I/O) device, the host bus for exchanging communications referencing a shared address space.

Method 450 may further include, at 470, representing a resource in the first I/O device to the host OS as residing in the AD, the representing based on the received resource information. In an embodiment, the representing the resource at 470 includes representing an address in the shared address space to the host OS as addressing the resource. The representing may be performed with a device driver process for the AD—e.g. where the resource information received at 460 includes information associated with the first I/O device, and wherein representing the resource to the host OS includes the AD providing the information associated with the first I/O device to the device driver.

The resource information 460 may configure the AD for various additional operations (not shown), according to different embodiments. By way of illustration and not limitation, the AD may be configured to perform an access of the first I/O device in response to an I/O request from the host OS which targets the address in the shared address space. Such an access may, for example, be based on the AD including or otherwise accessing memory mapping information indicating a correspondence of the resource with the address in the shared address space. Alternatively or in addition, the AD may be configured to block an enumeration request of the host OS to prevent an identification of the first I/O device as being a distinct physical device residing on the computer platform.

Figure 5:
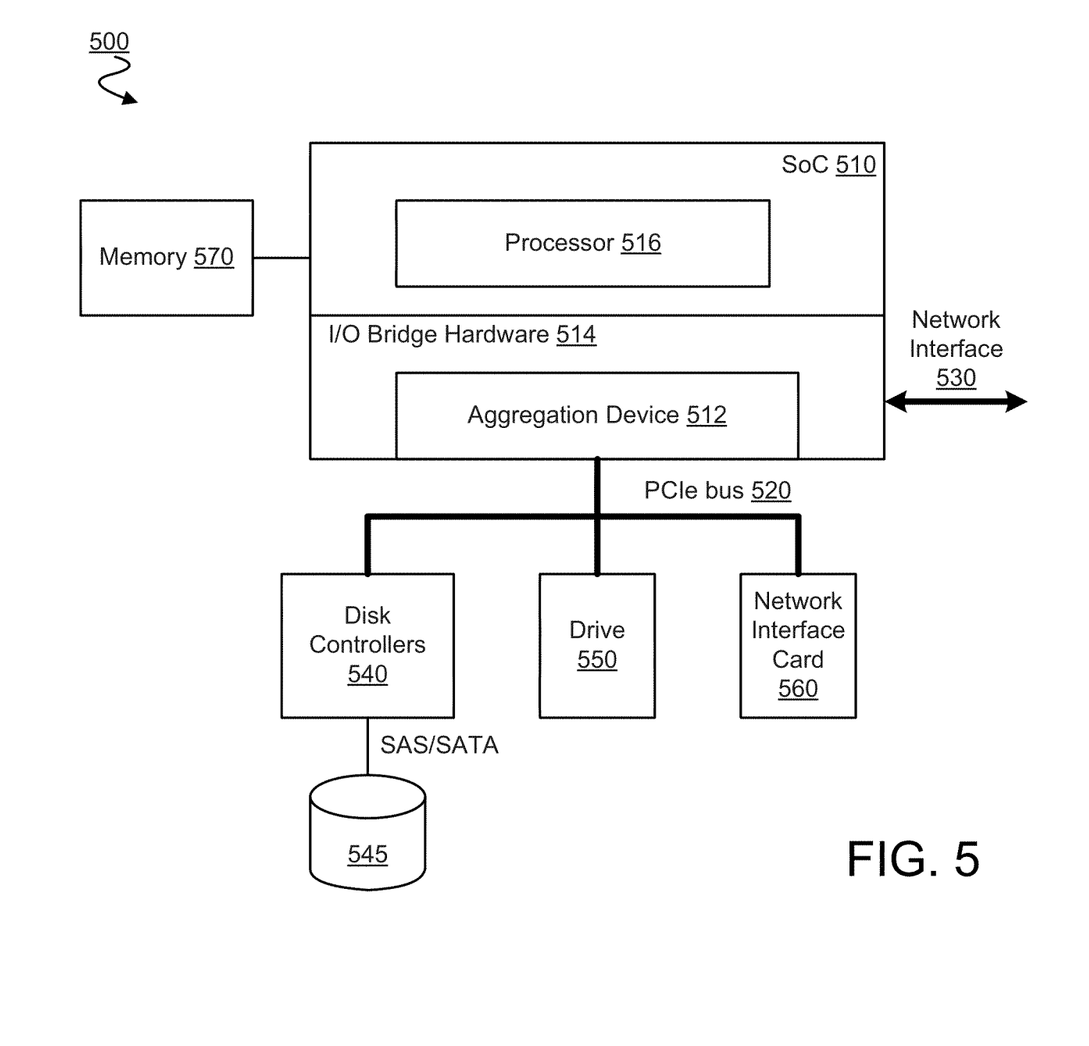
FIG. 5 is a block diagram illustrating features of a computer platform for managing resources of an aggregate device according to an embodiment.

FIG. 5 illustrates elements of a computer platform 500 for implementing device aggregation according to an embodiment. Computer platform 500 may, for example, perform some or all of the operations of method 400.

In an embodiment, computer platform 500 is a hardware platform of a personal computer system such as a desktop computer, laptop computer, a handheld computer—e.g. a tablet, palmtop, cell phone, media player, and/or the like—and/or other such computer system. Alternatively or in addition, computer platform 500 may provide for operation as a server, workstation, or other such computer system.

Computer platform 500 may include some or all of the functionality of system 200a and/or system 200b, for example. By way of illustration and not limitation, computer platform 500 may include aggregation device (AD) 512 to provide functionality of AD 224. AD 512 may expose resources of one or more child devices to executing software, wherein the AD 512 is coupled to a processor executing a host OS and further coupled to via a host bus one or more I/O devices.

To illustrate certain elements of one or more embodiments, AD 512 is shown residing in I/O bridge hardware 514 of a system on chip (SoC) device 510 which includes a processor 516 to execute a host OS. However, functionality of system 200a and/or system 200b may be variously implemented by any of a variety of additional or alternative hardware architectures, according to various embodiments.

A host bus of computer platform 500 is represented by an illustrative PCIe bus 520 coupled to AD module 512. However, computer platform 500 may include any of a variety of additional or alternative host buses, according to various embodiments. The one or more I/O devices are represented by an illustrative set of devices which are variously coupled directly or indirectly to PCIe bus 520. More particularly, PCIe bus 520 is shown coupling AD module 512 to a disk controller 540—e.g. a host bus adapter, RAID adapter and/or the like—which, in turn, couples a storage 545 to PCIe bus 520. In an embodiment, disk controller 540 provides disk array controller functionality—e.g. where storage 545 includes multiple data storage drives. Disk controller 540 may, for example, support Serial Advanced Technology Attachment (SATA), Serial Attached SCSI (SAS), Fibre Channel (FC) or any of a variety of additional or alternative interface standards for communicating with one or more drives in storage 545.

Additionally or alternatively, PCIe bus 520 may, for example, directly couple to one or more hard disk and/or solid state drives, represented by an illustrative hard drive 550. However, the I/O devices of computer platform 500 which are coupled to AD 512 via PCIe bus 520 are not limiting on certain embodiments, and may include any of a variety of combinations of one or more additional or alternative I/O devices. In an alternate embodiment, AD 512 is hardware which is not "in-line" with a communication path between processor 516 and PCIe bus 520. For example, AD 512 may provide aggregation functionality for configuring software to handle message exchanges—e.g. where PCIe bus 520 a driver process executing in processor 516 exchange messages along a hardware communication path which is independent of AD 512.

In an embodiment, host bus 520 is distinguished from a memory bus system coupling the processor 516 to a main memory—represented by an illustrative memory 570—for storing current software state. For example, SoC 510 may include or otherwise have access to memory controller circuit logic (not shown) for controlling access to memory 570. In an embodiment, such access may be provided via a communication path of computer platform 500 which is independent of host bus 520.

In an embodiment, computer platform 500 may include one or more additional host buses (not shown)—e.g. each host bus directly coupled to AD 512. In such an embodiment, logic associated with AD 512 may operate to provide for representation of an aggregate device which includes resources spanning devices across the multiple host buses.

Computer platform 500 may further include a network interface 530—e.g. coupled directly or indirectly to I/O bridge 514, although certain embodiments are not limited in this regard. Network interface 530 may, for example, couple computer platform 500 to any of a variety of combinations of networks including, but not limited to, one or more of a dedicated storage area network (SAN), a local area network (LAN), a wide area network (WAN), a virtual LAN (VLAN), an Internet, and/or the like. Network interface 530 may, for example, include a wireless network interface, a network interface card a wired or wireless network interface card (NIC), a wired or wireless modem, a wired or wireless receiver and/or transmitter, a wired or wireless transmitter-receiver and/or transceiver, a radio frequency (RF) communication unit or transceiver, or other such unit able to transmit and/or receive signals, blocks, frames, transmission streams, packets, messages and/or data. Network interface 530 may include, or may be associated with, for example, one or more antennas, e.g., a dipole antenna, a monopole antenna, an omni-directional antenna, an end fed antenna, a circularly polarized antenna, a micro-strip antenna, a diversity antenna, or the like. In an embodiment, AD 512 may include network interface 530 as part of an aggregated device.

During operation, device resource information may be exchanged within computer platform 500—e.g. the exchange in aid of representing an aggregate device to a host OS executing in processor 516. Such device resource information may, for example, include enumeration information having some or all of the features of resource information 350.

In an embodiment, enumeration information is retrieved from non-volatile memory of computer platform 500—e.g. as part of an enumeration process to identify physical devices which are present on computer platform 500. Such enumeration may, for example, be performed by boot-time software (e.g. BIOS software, UEFI software and/or the like) executing on processor 516. The enumeration information may include PCI configuration space data or any of a variety of additional or alternative types of information which, for example, are exchanged according to conventional device enumeration techniques. The enumeration information may represent AD 512 as a distinct physical device—e.g. where the enumeration information includes a device ID which is specific to AD 512. In an embodiment, some or all of such enumeration information may also be provided to a driver for AD 512—e.g. for the driver's own internal enumeration to detect for devices.

Additionally or alternatively, information exchanged within computer platform 500 may include aggregation information. In an embodiment, aggregation information is retrieved from non-volatile memory of computer platform 500—e.g. by boot-time software executing on processor 516. The aggregation information may specify or otherwise indicate that a particular combination one or more I/O devices—e.g. including one or more of disk controller 540, storage 545 and drive 550—are to operate as one or more child devices of the represented aggregate device. Alternatively or in addition, the one or more I/O devices to serve as child devices may include a device on another platform (not shown) which is networked with computer platform 500—e.g. via a network interface card 560 of computer platform 500. Such a networked platform may, for example, share with the host OS of computer platform 500 an address space used in communications exchanged via PCIe bus 520. AD 512 may serve, for example, as the parent device to such one or more child devices.

Additionally or alternatively, information exchanged within computer platform 500 may include allocation information. In an embodiment, boot-time software determines—e.g. by examining each device to be aggregated to determine its resource requirements—an amount of resources of computer platform 500 which should be allocated for operation of the represented aggregate device. By way of illustration and not limitation, such boot-time software may determine, for each parent device and child device of a represented aggregate device, a respective amount of address space in the system memory map and/or other resources which that device will require for operation. A total amount of resources for all parent and child devices may then be determined by the boot-time software. Based on that determined total amount of resources, the boot-time software may issue a request for the host OS to allocate resources for use by the aggregate device.

In an embodiment, configuration of one or more components in computer platform 500 may be based on device aggregation information. For example, aggregation information may determine at least in part a selective blocking of communication via one or more ports on PCIe bus 520. By way of illustration and not limitation, aggregation information may specify that a particular device—e.g. drive 550—is to serve as a child device, where a bus driver or other component of the host OS is to be prevented from enumerating—e.g. receiving information indicating—that drive 550 is a distinct physical device which is present in computer platform 500.

To prevent such enumeration, boot-time software, AD 512 and/or a driver process for AD 512 may implement hardware and/or software mechanisms to block one or more types of host OS enumeration communications on PCIe bus 520 which directly address drive 550 and/or its corresponding port on PCIe bus 520. For example, AD 512 may contain logic which examines all enumeration messages (or other messages), wherein no such message may be issued to PCIe bus 520 without first being examined. AD 512 may determine, based on information contained within the message, such as the destination address and/or other information, that a message should be blocked. AD 512 may, in lieu of a response message generated by blocked disk controller 540, drive 550, and/or similar device, issue its own response message. The response message may contain information stating that no such device is attached to PCIe bus 520.

For example, drive 550 and/or the corresponding port on PCIe bus 520 may be hidden from PCI (or PCIe) requests—such as CF8h/CFCh and MMCFG requests—by which the host OS might otherwise access enumeration information specific to drive 550. In an embodiment, the PCIe Root Complex or other corresponding agent of computer platform 500 may generate a Master Abort in response to such CF8h/CFCh and/or MMCFG access attempts. Accordingly, a hidden child device may be made accessible to the host OS only through an AD-aware driver.

Figure 6:
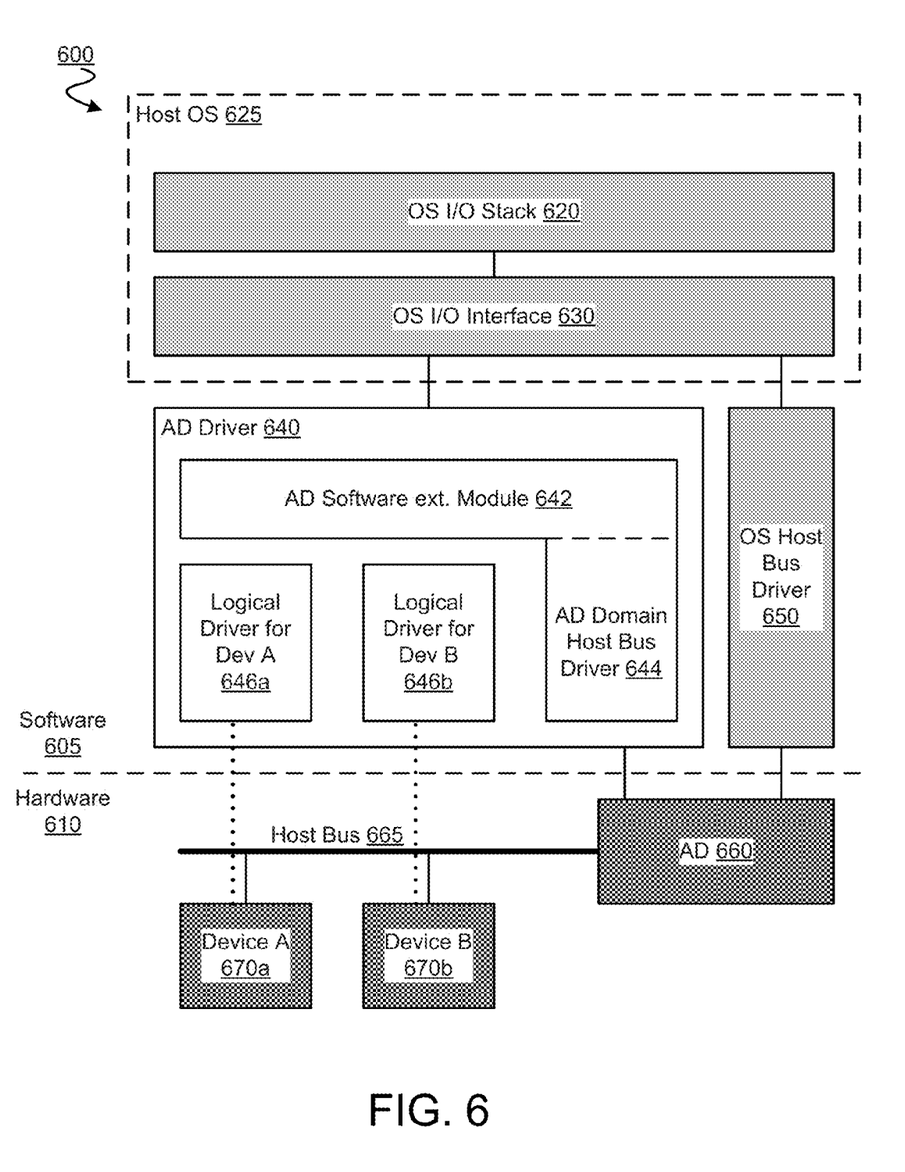
FIG. 6 is a block diagram illustrating features of a computer platform for providing device aggregation according to an embodiment.

FIG. 6 illustrates some elements of a computer platform 600 for providing device aggregation according to an embodiment. Computer platform 600 may include some or all of the features of computer platform 500, for example.

In an embodiment, computer platform 600 includes hardware 610 and software 605 executing with a processor and memory (not shown) of hardware 610. For example, software 605 may include a host OS 625 to control operation of one or more I/O devices which are coupled to a host bus 665 in hardware 610. By way of illustration and not limitation, hardware 610 may include a device A 670a and a device B 670b coupled via host bus 665 to AD 660. In an embodiment, AD 660 and host bus 665 provide, respectively, functionality corresponding to that of AD 512 and PCIe bus 520. For example, AD 660 may provide some or all of the functionality of AD 300.

The host OS 625, for example, may contain an OS I/O stack 620 and an OS I/O interface 630. OS I/O stack 620 may include software logic for exchanging with applications (not shown) information which is to be variously exchanged via OS I/O interface 630 with one or more of device A 670a, device B 670b and AD 660. The host OS 625 may include one or more additional components (not shown) such as a memory manager, authentication handler, system call interface, task scheduler, and/or the like.

To facilitate the exchange of such I/O communications, various embodiments provide an AD driver 640 of software 605 to support management of a volume which includes resources spanning multiple devices variously coupled to host bus 665. In an embodiment, AD driver 640 includes an AD software module 642—i.e. a set of one or more driver functions, methods or other such processes (and/or state information in support thereof) specific to operating AD 660.

Alternatively or in addition, AD driver 640 may encapsulate one or more logical drivers to facilitate representation of an aggregate device to the host OS. The one or more logical drivers encapsulated by AD driver 640 may variously provide respective driver mechanisms each for a different I/O device coupled to AD 660 via host bus 665.

By way of illustration and not limitation, AD driver 640 may encapsulate logical drivers 646a, 646b which are to variously drive device A 670a and device B 670b, respectively. In an embodiment, AD software module 642 may include or couple to AD host bus driver logic 644 for driving operation of host bus 665 with AD 660. Such operation of host bus 665 with AD 660 may, for example, be independent of an OS host bus driver 650 of software 605.

For example, logical drivers 646a, 646b may be programmed to exchange information directly via OS I/O Interface 630, or similar interface. AD Driver 640 may provide an identical or similar Logical Driver Interface (not pictured) which, instead of exchanging information with the OS I/O Stack 620, exchanges information with other components of AD Driver 640, such as AD Software Module 642. A compiler, linker, loader, and/or the like may statically or dynamically link logical drivers 646a, 646b to the Logical Driver Interface instead of OS I/O Interface 630, thus causing them to exchange information via the Logical Driver Interface instead of the OS I/O Interface 630.

AD driver 640 may be used to provide device aggregation across multiple devices including the AD 660 and one or more I/O devices coupled to the AD 660 via host bus 665. In an embodiment, one or more logical device drivers encapsulated by AD driver 640 may each provide respective functionality for I/O access to a corresponding child device. A logical driver may, for example, present a storage volume of a respective child device to AD driver 640, providing I/O access (e.g. read and/or write access) to that device. In an embodiment, a logical driver may implement a communication standard—e.g. Advanced Host Controller Interface (AHCI), Small Computer System Interface (SCSI), Non-Volatile Memory Host Controller Interface (NVMHCI), and/or the like—which is appropriate for communication with a particular child device.

In an embodiment, AD driver 640 may implement Redundant Array of Independent Disk (RAID) driver functionality—e.g. without requiring changes to conventional functionality of the host OS. The host OS may see only AD 660 as an owner of resources which are actually located in a child device of AD 660. AD 660 and/or AD driver 640 may assure that some or all communications to implement access to a resource of such a child device appear to the host OS to source from and/or sink to the AD 660.

By variously encapsulating one or more logical drivers, AD driver 640 may operate to support a combining of N (e.g. two or more) physical volumes of respective host bus devices into M (e.g. one or more) logical volumes. AD driver 640 may, in one or more respects, represent these one or more logical volumes to the host OS 625 as if they were each a physical volume—e.g. without providing the I/O manager layer of the host OS with direct visibility into an underlying volume of a physical child device. A user may be provided with a BIOS setup interface or other such means for seeing properties (e.g. performance, capacity) of such a physical I/O device and/or means for configuring aggregation of the I/O device.

AD 640 may control communication with one or more child devices—e.g. through redirection and/or other modification of a communication to access a memory resource of a child device. Functionality to support such modification of a communication may be provided without requiring modification to a host OS which might otherwise—e.g. according to conventional device management techniques—assign distinct device drivers per host bus device.

In an embodiment, some physical volumes are exposed to system software by AD driver 640. However, one or more other physical volumes are not directly exposed, but are instead used as caches for the exposed volumes. Thus, I/O to the physical volumes may also access hidden cache volumes—e.g. where AD driver 640 is directly responsible for tracking and managing cache state. AD driver 640 also may expose to a user a means to view all physical volumes and configure which volumes should be caches for others.

In preparation for representing one or more logical volumes to host OS 625, AD driver 640 may internally enumerate one or more host bus devices and/or identify an enumerated device as being a child device which, for management purposes, is owned by AD 660. AD driver 640 may selectively expose one or more resources of such child devices to host OS 625—e.g. representing such resources to the host OS as belonging to the AD 512 or other such hardware of an AD.

Representation of the aggregate device may include and/or be based upon a determination of which enumerated I/O devices of computer platform 600 are designated as child devices. Control logic of the AD and/or logic of AD driver 640 may provide and/or operate based on aggregation information which describes whether a host bus I/O device has such a child device designation.

In an embodiment, software which executes during boot-up operations (for brevity, referred to herein as "host software") of computer platform 600 may determine aggregation information stored, for example, in non-volatile memory of computer platform 600. The aggregation information may, for example, be previously programmed by a user—e.g. via software which provides BIOS setup menu options—although certain embodiments are not limited in this regard. Such aggregation information may be loaded into a flash memory component or other non-volatile storage element—e.g. an Advanced Configuration and Power Interface (ACPI) table or other such repository.

Based on such aggregation information, the boot-time software may identify any I/O devices which are to operate as child devices of the AD. Alternatively or in addition, the boot-time software may determine from aggregation information one or more ports of host bus 665 which are to be at least partially blocked.

Based on such enumeration, the host software may configure AD 660 to require an allocation of enough space in the system memory map for all resources of the volume to be managed. By way of illustration and not limitation, the host software may compute a total of memory resources required by all child devices—e.g. including resources required by ports which are to be blocked to prevent host OS enumeration or direct communication with the child devices. For example, the boot-time software may determine respective memory allocation requirements for each of child device of the AD.

In an embodiment, representing an aggregate device to a host OS includes providing mechanisms to represent interrupt messaging and/or interrupt handling to the host OS as being implemented at the aggregate device—e.g. rather than being implemented at some underlying child device. Control logic of the AD 660 and/or logic of AD driver 640 may provide for such representation of interrupt messaging/handling mechanisms.

Any of a variety of resources of computer platform 600—e.g. a blocked port, a switch, a target storage device and/or the like—may generate an error notification, a hot-plug notification, a power state notification, or other event notification which would normally be handled by the host OS using bus driver 650. In an embodiment, one or more mechanisms may provide for host bus 665 to instead issue an interrupt to AD driver 640. Host bus 665 may, for example, provide interrupt information for an event to AD driver 640. Such events may be handled, for example, by AD 660 and/or a logical bus driver which is encapsulated by AD driver 640—e.g. rather than being handled by OS host bus driver 650 and/or host OS 625.

In one embodiment, host software configures interrupt messaging and/or handling for AD 660—e.g. during device initialization. For example, host software may assign to AD 660 one or more interrupts to be received from system software via the host OS I/O manager. Based on such an assignment, AD driver 640 may be configured to execute a particular interrupt handler when an assigned interrupt from system software is detected. In an embodiment, AD 660 may be configured with multiple interrupt vectors (e.g., in a MSI-X table)—e.g. where one or more child devices each be configured to variously generate a subset of such interrupt vectors. Thus, AD driver 640 may track which interrupt vectors may arrive from which child devices to identify which logical device driver instances may expect which interrupt vectors.

AD driver 640 and/or the host software may further configure one or more child devices to provide interrupt messaging/handling in cooperation with AD 660 (e.g. in cooperation with AD driver 640). By way of illustration and not limitation, information may be copied from the AD to a child device—e.g. to a PCI configuration space of the child device. For example, AD driver 640 may use interrupt table entries (not shown) stored in AD 660—e.g. entries of a message signaled interrupt (MSI) table such as an MSI-X table—to assign interrupts to endpoint child devices that it owns. For example, the AD-aware driver 640 may assign a respective MSI-X vector to each managed endpoint device. Based on MSI or other such interrupt configuration information, the child device may issue interrupt messages which system software interprets as coming from AD 660. In response, system software may invoke AD driver 640 to perform interrupt handling.

AD driver 640 may handle such an interrupt without notifying software, such as an OS host bus driver 650 executing separately from AD driver 640, which might otherwise handle such an interrupt if the child device were enumerated by the host OS. In certain embodiments, such interrupt handling may include AD driver 640 calling an interrupt handler routine of a logical driver instance responsible for the child device which issued the interrupt—e.g. by invoking a corresponding Interrupt Service Routine (ISR) of the logical driver. In an embodiment, the logical driver instance executes under—e.g. is encapsulated by—AD driver 640. The logical bus driver may handle the event—e.g. without host OS 625 being made directly aware of the child device's involvement in the interrupt message and/or handling.

In an embodiment, a child device may alternatively or additionally be provided with an address in the system memory map which is for use by interrupt redirect logic of AD 660 (or of AD driver 640). In response to a child device issuing an interrupt message to such an address, interrupt redirect logic may provide an alternate interrupt message to system software—e.g. in lieu of the original interrupt message sent by the child device. By way of illustration and not limitation, the alternate interrupt message may be a substitute interrupt message or a modified version of the original interrupt message. The alternate interrupt message may, for example, have source information to represent the alternate interrupt message to system software as being generated by AD 660. Accordingly, the host OS may respond to such an alternate interrupt message by performing a call to AD driver 640 for interrupt handling. In an embodiment, AD driver 640 may in turn invoke an interrupt handling routine of a logical driver which is encapsulated by AD driver 640.

In an embodiment, if system software modifies an interrupt configuration for AD 660—for example, to change which processor receives an interrupt—interrupt redirection logic may automatically adjust its issuing of alternate interrupt messages according to the new configuration. Alternatively or in addition, if system software or AD driver 640 masks a particular type of interrupt, interrupt redirection logic may stop issuing interrupt messages of that type until the interrupt type is unmasked. Such interrupt redirection logic may hold one or more child device interrupts as a pending interrupt while the interrupt type is masked—e.g. and subsequently issue one pending interrupt immediately after the interrupt is unmasked.

In an embodiment where system software only supports pin-based interrupts, a target child device may still be configured with a message-based interrupt. For example, when it receives an interrupt message from a child device, the interrupt redirection logic may issue a pin-based interrupt belonging to AD 660, thus causing the system software to invoke interrupt handler logic via AD driver 640.

In one embodiment, multiple child devices may share one or more interrupts. Accordingly, AD driver 640 may not be able to determine, or may forego determining, a particular logical device driver instance to handle an interrupt message of a shared interrupt type. Rather, AD driver 640, in an embodiment, resort to calling the respective interrupt handlers of multiple logical driver instances which are each associated with the shared interrupt type. In such an embodiment, it may be the responsibility of each such logical device driver instance to determine whether it should act on a particular interrupt.

Under conventional device management techniques, certain event notices cause system software to re-enumerate an entire hierarchy of devices and/or cause the host OS to halt. By contrast, use of functionality of the AD to hide child devices from the host OS allows re-enumeration to be limited to only a subset of the hierarchy. Additionally or alternatively, such functionality may allow the host OS to run continuously while events are being handled.

Figure 7:
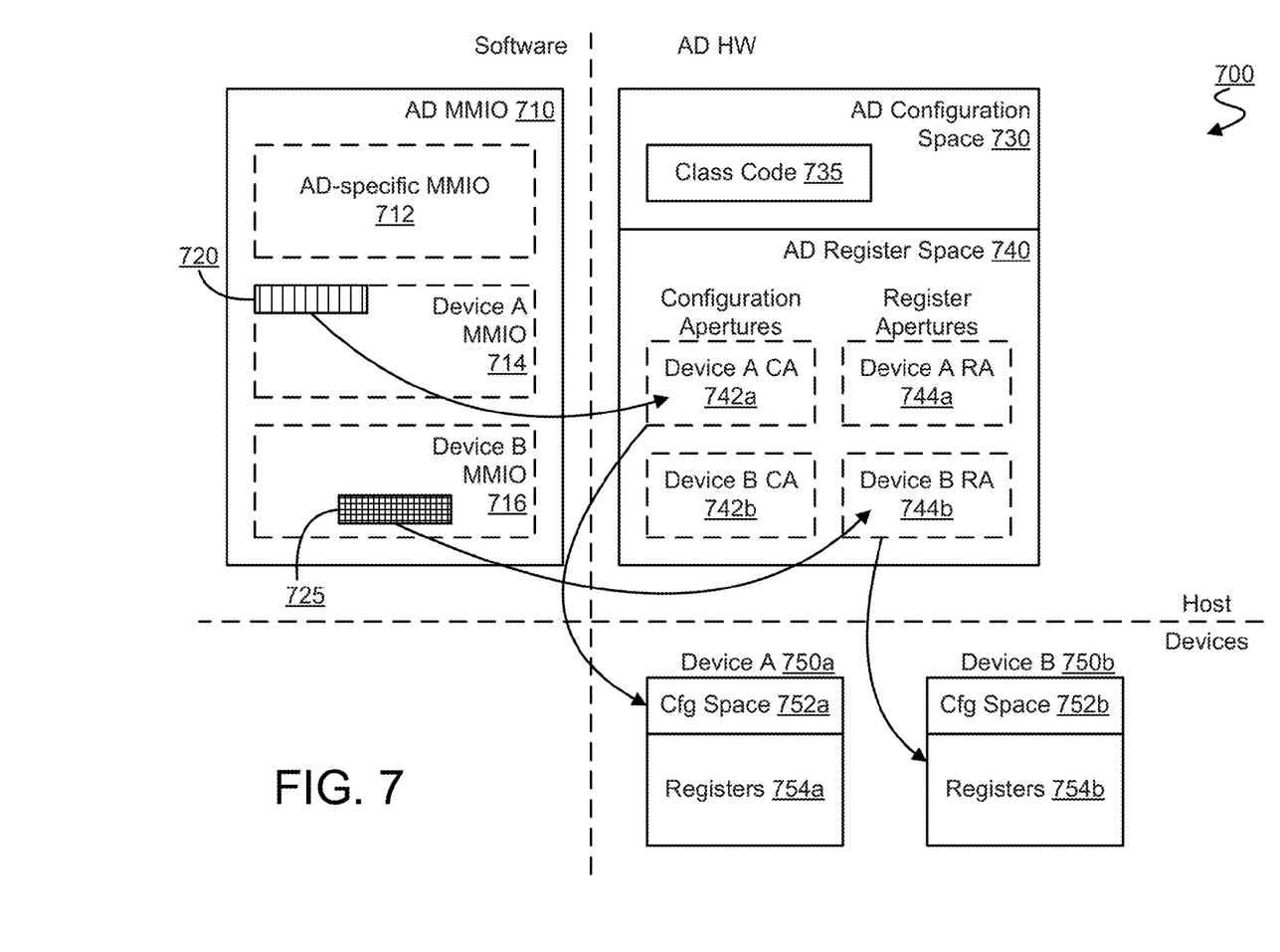
FIG. 7 is a flow diagram illustrating features of a memory mapping to support management of resources of an aggregate device according to an embodiment.

FIG. 7 illustrates elements of a memory mapping 700 in a computer platform for device aggregation according to an embodiment. In an embodiment, the computer platform includes one or more I/O devices—represented by an illustrative device A 750a and device B 750b—coupled to a system (for brevity, referred to herein as a host) of the computer platform which, for example, implements some or all of the functionality of system 200a or system 200b. By way of illustration and not limitation, device A 750a and device B 750b may be coupled via a host bus (not shown) to AD of the host—e.g. the AD to provide some or all of the functionality of AD 300. The computer platform may, according to different embodiments, include any of a variety of combinations of one or more additional or alternative I/O devices coupled via a host bus to such AD.

The computer platform may execute a host OS (not shown) including an I/O manager—e.g. providing some or all of the functionality of OS I/O stack 620 and OS I/O interface 630—to request I/O access to resources of one or more devices coupled to the host bus. In an embodiment, a representation of an aggregate device is made, in one or more respects, to the host OS, wherein a resource of the AD, and a resource of one or more other devices coupled to the AD via the host bus, are both represented to the host OS as residing on the aggregate device.

In an embodiment, the host OS includes or otherwise has access to AD memory mapped I/O (MMIO) 710—information describing a mapping of a set of addressable locations in system memory to the represented aggregate device. Based on such information, the host OS may direct I/O access requests to addressable locations represented in AD memory mapped I/O 710, where such I/O access requests are for access to the aggregate device. The host OS may have access to additional memory mapping information (not shown)—e.g. for accessing a device (logical or physical) other than the aggregate device—although certain embodiments are not limited in this regard.

Of the set of addressable locations represented in AD MMIO 710, subsets of the addressable locations may, in an embodiment, correspond to different respective devices which underlie the represented aggregate device. By way of illustration and not limitation, AD MMIO 710 may include AD-specific MMIO 712—i.e. information describing MMIO for accessing a resource which physically resides within the AD. Alternatively or in addition, AD MMIO 710 may include Device A MMIO 714—i.e. information describing MMIO for accessing a resource which physically resides within Device A 750a. Alternatively or in addition, AD MMIO 710 may include Device B MMIO 716—i.e. information describing MMIO for accessing a resource which physically resides within Device B 750b.

The host OS may be unable to determine in one or more respects that the aggregate device is actually a device comprised of resources of multiple underlying physical device. For example, the I/O manager may target an I/O request to an address represented in Device A MMIO 714 independent of any information which might identify Device A 750a as being a distinct device coupled to the host bus. Alternatively or in addition, the I/O manager may target an I/O request to an address represented in Device B MMIO 716 independent of any information which might identify Device B 750b as being a distinct device coupled to the host bus.

Logic associated with the AD—e.g. the AD itself and/or a driver corresponding to the AD—may include or otherwise have access to information for use in representing the AD to the host OS.

For example, the AD may include AD configuration space 730 to store configuration information specific to the AD—e.g. an illustrative class code 735 classifying one or more aspects of the AD. Such information may, for example, describe the AD according to conventions set forth in PCI, PCIe or other such standards. By way of illustration and not limitation, AD configuration space 730 may store vendor ID, device ID, bus/device/function (BDF) information, base address register (BAR) information and/or the like. Information in AD configuration space 730 may be communicated to the host OS—e.g. to identify the AD as a device on the computer platform.

Device A 750a may include storage comprising configuration space 752a and registers 754a. Configuration space 752a may, for example, store configuration information specific to device A 750a, the configuration information classifying one or more aspects of device A 750a. Information stored in configuration space 752a may, for example, be similar by type to that stored in AD configuration space 730. In an embodiment, device A 750a includes one or more additional registers 754a—e.g. where operation of device A 750a according to a configuration described in configuration space 752a is to implement an I/O access of one or more of registers 754a.

Additionally or alternatively, device B 750b may include storage comprising configuration space 752b and registers 754b. Configuration space 752b may, for example, store configuration information specific to device B 750b, the configuration information classifying one or more aspects of device B 750b. Information stored in configuration space 752b may, for example, be similar by type to that stored in AD configuration space 730. In an embodiment, device B 750b includes one or more additional registers 754b—e.g. where operation of device B 750b according to a configuration described in configuration space 752b is to implement an I/O access of one or more of registers 754b.

The logic associated with the AD may further include or otherwise have access to information for use in representing resources of one or more I/O devices to the host OS as belonging to an aggregate device. By way of illustration and not limitation, the AD may include AD register space 740 to store, for example, its own internal memory mapping information. AD register space 740 may store information which corresponds one or more addresses of system memory each to respective location in an I/O device—e.g. one or device A 750a and device B 750b. Based on memory mapping information in AD register space 740, the AD and/or its AD driver may direct I/O exchanges between a logical driver and its corresponding I/O device coupled to the host bus of the computer platform.

For example, memory mapping information in AD register space 740 may specify or otherwise indicate that one or more addressable locations of system memory are each to serve as a respective proxy (referred to herein as an aperture) for accessing a corresponding resource of an underlying physical host bus device.

For example, AD register space 740 may specify one or more configuration apertures each for accessing a respective configuration space of an I/O device. By way of illustration and not limitation, AD register space 740 may describe a device A configuration aperture 742a and a device B configuration aperture 742b by which the host OS accesses, respectively, configuration space 752a and configuration space 752b.

Additionally or alternatively, AD register space 740 may specify one or more register apertures each for accessing a respective register space of an I/O device. By way of illustration and not limitation, AD register space 740 may describe a device A register aperture 744a and a device B register aperture 744b by which the host OS accesses, respectively, registers 754a and registers 754b.

In an embodiment, an attempt by a logical driver to access a resource of the represented aggregate device using a particular address in system memory will result in the AD identifying a particular aperture—e.g. including identifying the corresponding resource of an I/O device which the aperture associates with that address.

In an illustrative scenario, a logical driver may issue a request for an access a location 720 in system memory, based on the AD MMIO 710 associating the location 720 with a resource of the represented aggregate device. The location memory may, for example, correspond to a resource of device A 750a, although the host OS may not be aware of such correspondence. Logic associated with the AD may determine that location 720, the target address of the I/O request, is associated with a particular aperture—e.g. device A configuration aperture 742a. Accordingly, the logic may modify, redirect, directly forward or otherwise operate on the I/O request to communicate the requested access to the corresponding resource—in this case, a resource in configuration space 752a.

In another illustrative scenario, a logical driver may issue a request for an access a location 725 in system memory, based on the AD MMIO 710 associating the location 725 with a resource of the represented aggregate device. The location memory may, for example, correspond to a resource of device B 750b, although the host OS may not be aware of such correspondence. Logic associated with the AD may determine that location 725, the target address of the I/O request, is associated with a particular aperture—e.g. device B register aperture 744b. Accordingly, the logic may modify, redirect, directly forward or otherwise operate on the I/O request to communicate the requested access to the corresponding resource—in this case, a resource in registers 754b.

Techniques and architectures for managing resources of a computer platform are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A device for operation in a computer platform, the device comprising:
   a first interface to couple the device to a host bus of the computer platform, the host bus to provide communications referencing a shared address space, wherein the first interface to couple the device via the host bus to a first input/output (I/O) device;
   an aggregation control unit including circuit logic to receive resource information generated by a pre-boot software process of the computer platform, wherein the resource information is to identify the first I/O device as a child device of the device, wherein, based on the first I/O device being identified by the resource information as the child device, the aggregation control unit to represent a first resource in the first I/O device to a host operating system (OS) of the computer platform as a resource that resides in the device, including the aggregation control unit to represent a first address in the shared address space to the host OS as addressing the first resource, wherein memory map information is to identify the first address to the host OS as an address of the device, and wherein a communication of enumeration information is to be blocked to prevent an identification of the first I/O device, by the host OS, as a physical device that is distinct from the device; and
   a second interface to provide communications between the aggregation control unit and a processor core executing the host OS.

2. The device of claim 1, wherein the resource information includes information associated with the first I/O device, and wherein the aggregation control unit to represent the first resource to the host OS includes the aggregation control unit to represent the first resource with a device driver for the device, including the aggregation control unit to provide the information associated with the first I/O device to the device driver for the device.

3. The device of claim 2, wherein the device driver is to encapsulate a logical device driver for the first I/O device.

4. The device of claim 2, wherein the device driver includes driver logic to operate the host bus.

5. The device of claim 1, wherein the aggregation control unit includes logic to perform an access of the first I/O device, wherein the access is in response to an I/O request from the host OS, wherein the I/O request targets the first address.

6. The device of claim 1, wherein the device and a device driver for the device are to operate to block an enumeration request of the host OS to prevent an identification of the first I/O device as being a distinct physical device of the computer platform.

7. The device of claim 1, wherein the first I/O device includes an interrupt mechanism, and wherein the device and the device driver are to represent the interrupt mechanism to the host OS as a mechanism of the device.

8. The device of claim 1, wherein the first I/O device is configured send to the host OS an event notification including information that represents the event notification as originating at the device.

9. A method at an aggregation device of a computer platform, the method comprising:
   receiving resource information generated by a pre-boot software process of the computer platform, wherein the aggregation device is coupled to a first input/output (I/O) device via a host bus that provides communications referencing a shared address space, wherein the aggregation device is further coupled to a processor core of the computer platform executing a host operating system (OS), the resource information identifying the first I/O device as a child device of the aggregation device; and
   based on the received resource information, representing a first resource in the first I/O device to the host OS as residing in the aggregation device, including representing a first address in the shared address space to the host OS as addressing the first resource, wherein memory map information identifies the first address to the host OS as an address of the aggregation device, wherein a communication of enumeration information is blocked to prevent an identification of the first I/O device, by the host OS, as a physical device that is distinct from the aggregation device.

10. The method of claim 9, wherein the resource information includes information associated with the first I/O device, and wherein representing the first resource to the host OS includes representing the first resource with a device driver for the aggregation device, including providing the information associated with the first I/O device to the device driver for the aggregation device.

11. The method of claim 10, wherein the device driver encapsulates a logical device driver for the first I/O device.

12. The method of claim 10, wherein the device driver includes driver logic that operates the host bus.

13. The method of claim 9, further comprising performing an access of the first I/O device, wherein the access is in response to an I/O request from the host OS targeting the first address.

14. The method of claim 9, further comprising blocking an enumeration request of the host OS to prevent an identification of the first I/O device as being a distinct physical device residing on the computer platform.

15. The method of claim 9, wherein the first I/O device includes an interrupt mechanism, and wherein the aggregation device and the device driver are to represent the interrupt mechanism to the host OS as residing in the aggregation device.

16. The method of claim 9, wherein the first I/O device sends to the host OS an event notification including information representing the event notification as originating at the aggregation device.

17. A non-transitory computer-readable storage medium having stored thereon instructions which, when executed by one or more processing units, cause the one or more processing units to perform a method comprising:
with a device driver for an aggregation device of a computer platform:
receiving resource information generated by a pre-boot software process of the computer platform, wherein the aggregation device is coupled to a first input/output (I/O) device via a host bus that provides communications referencing a shared address space, wherein the aggregation device is further coupled to a processor core of the computer platform executing a host operating system (OS), the resource information identifying the first I/O device as a child device of the aggregation device; and
based on the received resource information, representing a first resource in the first I/O device to the host OS as residing in the aggregation device, including representing first address in the shared address space to the host OS as addressing the first resource, wherein memory map information identifies the first address to the host OS as an address of the aggregation device, wherein a communication of enumeration information is blocked to prevent an identification of the first I/O device, by the host OS, as a physical device that is distinct from the aggregation device.

18. The computer-readable storage medium of claim 17, the method further comprising encapsulating in the driver for the aggregation device a logical device driver for the first I/O device.

19. The computer-readable storage medium of claim 17, further comprising encapsulating driver logic to operate the host bus in the device driver for the aggregation device.

20. The computer-readable storage medium of claim 17, the method further comprising performing an access of the first I/O device in response to an I/O request from the host OS targeting the first address.

21. The computer-readable storage medium of claim 17, wherein the aggregation device and a device driver for the aggregation device are to operate to block an enumeration request of the host OS to prevent an identification of the first I/O device as being a distinct physical device residing on the computer platform.

22. The computer-readable storage medium of claim 17, wherein the first I/O device includes an interrupt mechanism, and wherein the aggregation device and the device driver are to represent the interrupt mechanism to the host OS as residing in the aggregation device.

23. The computer-readable storage medium of claim 17, wherein the first I/O device is configured send to the host OS an event notification including information representing the event notification as originating at the aggregation device.

24. A method in a computer platform, the method comprising:
during pre-boot operation of the computer platform:
determining a configuration for an aggregation device of the computer platform, the aggregation device coupled to a first input/output (I/O) device via a host bus that provides communications referencing a shared address space, the aggregation device further coupled to a processor core of the computer platform for executing a host operating system (OS);
generating resource information to implement the determined configuration of the aggregation device; and
providing the resource information to the aggregation device, wherein the aggregation device, based on the provided resource information, represents a first resource in the first I/O device to the host OS as residing in the aggregation device, wherein the aggregation control unit represents a first address in the shared address space to the host OS as addressing the first resource, wherein memory map information identifies the first address to the host OS as an address of the aggregation device, wherein a communication of enumeration information is blocked to prevent an identification of the first I/O device, by the host OS, as a physical device that is distinct from the aggregation device.

25. The method of claim 24, wherein determining the configuration for the aggregation device includes identifying that the first I/O device is to operate as a child device of the aggregation device.

26. The method of claim 24, wherein generating the resource information includes determining a total amount of resources required for an aggregate device, wherein the aggregation device is a parent device of the aggregate device and the first I/O device is a child device of the aggregate device.

27. The method of claim 26, wherein providing the resource information to the aggregation device is to configure the aggregation device to request from the host OS an allocation of the total amount of resources.

* * * * *